United States Patent [19]

Cole et al.

[11] 3,787,813

[45] Jan. 22, 1974

[54] DATA PROCESSING DEVICES USING CAPABILITY REGISTERS

[75] Inventors: Alun John Cole, Broadstone; John Michael Cotton, Windsor; David Cockburn Cosserat, London, all of England

[73] Assignee: Plessey Handel Und Investments A.G., Zug, Switzerland

[22] Filed: May 24, 1971

[21] Appl. No.: 146,334

[30] Foreign Application Priority Data

May 26, 1970 Great Britain .................. 25,245/70

[52] U.S. Cl. .............................................. 340/172.5

[51] Int. Cl. .............................................. G06f 9/20

[58] Field of Search ................................. 340/172.5

[56] References Cited

UNITED STATES PATENTS

| | | | |
|---|---|---|---|
| 3,546,677 | 12/1970 | Barton et al. | 340/172.5 |
| 3,614,746 | 10/1971 | Klinkhamer | 340/172.5 |

*Primary Examiner*—Harvey E. Springborn

*Attorney, Agent, or Firm*—Blum, Moscovitz, Friedman & Kaplan

[57] ABSTRACT

A data processing device, for use in a time-sharing computer system, comprises a central processing unit and a storage unit, the information in the storage unit being arranged in segments and the central processing unit includes a plurality of capability registers each arranged to store descriptor information indicative of the base and limit addresses of an information segment. One of the capability registers is arranged to hold information defining the base and limit addresses of an information segment which contains a segment pointer table, particular to the program currently being executed by the central processing unit and a further one of the registers is arranged to hold information defining the base and limit addresses of an information segment which contains a master capability table having an entry for each information segment in the storage unit composed of information defining the base and limit addresses of a segment. The segment pointer table comprises a list of data words which are used as pointers to define different entries in the master segment table.

3 Claims, 7 Drawing Figures

DATA PROCESSING DEVICES USING CAPABILITY REGISTERS

The present invention relates to data processing devices and is more particularly concerned with such devices, for use in time sharing systems, which include addressing systems which inherently provide memory protection.

In time-sharing computer systems it is of the utmost importance to ensure that a user program cannot, under fault conditions (either hardware of software), intefere with the system supervisor program or with any of the other user programmes. Such protection is provided by the incorporation into the computer system of memory protection arrangements. These arrangements may either be of the hardware or software type.

Professor M.V. Wilkes in his book "Time-Sharing Computer Systems", published in 1968 by American Elsevier Inc.: New York, in chapter 4 "Design of a system" considers the use of hardware registers called "capability registers", which are loaded with segment descriptors. Each segment descriptor consists of a base, limit and type code and is used to define the start address (base), last address (limit) and mode of permitted access (type code) for each storage segment in system storage or memory. Each program is provided with a set of "capabilities" defining the program and data segments to which the central processor will be allowed access when performing that program. The capability register system arrangement is described in detail in pages 49 to 59 of the second impression 1969 of the above mentioned book under the head of "Memory protection".

The present invention comtemplates the use of such capability registers to provide a very secure memory protection system which may be used for example in a real-time multi-processor complex suitable for use in the stored program control of telecommunication systems for example telephone, telegraph or data switching systems.

In such systems it is often necessary to arrange for program and data segments (collectively referred to as information segments) to be moved within the storage system complex. In fact in large systems it may be necessary to provide a multiplicity of differing types of storage devices to accommodate the entire complex of information necessary to control the telecommunication system. For example the storage system may consist of a main memory, formed of high speed access magnetic core or thin-film stores, backed by a number of bulk storage devices such as magnetic drums, magnetic tape stores and large, slow-access, magnetic core stores. The central processor units are arranged to work on program and data blocks (or segments) in the high-speed access main memory and the information segments are arranged to be moved from the backing storage when required. Additionally it is necessary, under say main memory store module failure conditions, to relocate vital information segments in standby or other storage modules to maintain the operational efficiency of the telecommunication system. When such relocation occurs it is mandatory upon the store addressing system to ensure that the links to the information segments which have been moved are retained and correctly updated in as short a time period as is possible.

It is an object of the present invention to provide a data processing device incorporating a memory addressing system which includes memory protection arrangements and which allows for the relocation of information segments without requiring complex link modification processes to be performed.

According to the invention there is provided a data processing device, for use in a time-sharing computer system, comprising a central processing unit and a storage unit, the information in said storage unit being arranged in segments and said central processing unit includes a plurality of capability registers each arranged to store segment descriptor information indicative of the base and limit addresses of an information segment characterised in that one of said capability registers is arranged to hold information defining the base and limit addresses of an information segment which contains a segment pointer table, particular to the program currently being executed by said central processing unit, and a further one of said capability registers is arranged to hold information defining the base and limit addresses of an information segment which contains a master capability table, said master capability table having an entry for each information segment in said storage unit composed of information defining the base and limit addresses of a segment, while said segment pointer table comprises a list of data words which are used as pointers to define different entries in said master segment table.

The provision of at least one segment pointer table for each program allows the supervisory program to allocate segments to each program at program load time and it can therefore closely define the store areas within which a program may work. The use of the single master capability table referenced by the pointers of the segment pointer tables eases the problems created by information segment movement. By the provision of a segment pointer table for each program of the system a corresponding segment pointer may be copied into a standard location in a particular program's dump area and this pointer may be used to reconstruct the contents of the capability registers when the program is reactivated after being dormant. This technique eases the problems of relocation when the information segments are moved about the storage system, as it is only necessary to change the appropriate entry or entries in the master capability table to remain aware of their new location.

It is not necessary to search through many levels of sub-routines and many program dump areas to modify links to the moved segment or segments. Hence provided the base and limit information for any particular information segment is always held in the same entry of the master capability table the pointers in the segment pointer tables will always be valid. The actual location of the segment of course is then provided by the base and limit information derived from the master capability table. When it is required to load a capability register, other than those holding the information for the segment pointer table and the master capability table, it is simply necessary for the instruction word (i) to define which capability register is to be loaded, (ii) to select the capability register currently holding the segment pointer table segment descriptor and (iii) to define the required offset down the segment pointer table which will allow access to the master capability table at the entry which corresponds with the segment required. Upon receiving this information the central processor uses the selected capability register to derive the base address of the segment pointer table to which the instruction defined offset is added. The so defined location in the segment pointer table is then read to produce a pointer which is used as an offset in the master capability table. The base address from the further capability register is then used with the pointer to define the required entry in the master capability table. Access to the required entry in the master capability table is now made to derive the current base and limit information for the required segment and this information is then passed to the instruction word selected capability register. Conveniently, for protection purposes, the further capability register (i.e. that storing the segment descriptor for the master capability table) is arranged not to be selectable by an instruction word and it is loaded for example under system start-up conditions. The capability register which holds the segment descriptor defining the segment pointer table, however, is instruction word addressable and it is loaded when a program change occurs.

According to a feature of the invention there is provided a data processing device in which each of said capability registers also holds access type information indicative of the permitted mode of access which may be made by the program to the segment defined by the segment descriptor information contained therein and each of said words in said segment pointer table is accompanied by access type information.

The arrangement of each entry in a segment pointer table in two parts (i.e. access type code and master capability table offset) requires the access type code to be separately loaded into the selected capability register at a different time to that of loading the base and limit addresses. However, the removal of the access type code from the master capability table entry has a particular advantage as it permits the same store segment to be accessed by two or more separate programs using differing access type codes. For example a segment may be arranged to be "read-only" to one program while the same segment may be "read-write" to another. Thus the same entry in the Master Capability Table can be used for each capability using that segment as the type code for each is separately derived.

According to a further feature of the invention there is provided a data processing device in which each entry in said master capability table also includes a segment descriptor check code having a characteristic relationship to the base and limit address information of the same entry and said central processing unit is arranged, when performing a load capability register operation to independently compute a local check code from the base and limit address information in that capability register and to compare it with said segment descriptor check code.

The use of a third item in each entry in the master capability table allows for the checking of the "load capability register" operation to guarantee the setting of the capability registers. Typically the segment descriptor check code is the SUM of the base and limit address information and it is compared at capability register load time, with the sum of the address information in the recently loaded capability register under the control of the arithmetic circuits of the central processor unit (CPU). This check arrangement serves two main purposes, it guarantees the accuracy of the capability registers when loaded and in addition it provides a check on a large area of the CPU.

The invention will now be described by way of example with reference to the accompanying drawings. Of the drawings:

FIGS. 1*a* and 1*b* show a simplified block diagram of the central processing unit of a data processing device incorporating the invention, FIG. 2 shows the lay-out of the capability registers of the data processing device, FIG. 3 shows a typical allocation arrangement for the type code of a segment descriptor, FIG. 4 shows the lay-out of an instruction word, FIG. 5 shows a schematic diagram of the operations performed when executing a "load workspace capability register" using the "reserved segment pointer table" and the "master capability table" while FIG. 6 shows a flow diagram of the "load workspace capability register" instruction.

Referring firstly to FIGS. 1a and 1b which should be placed side by side with FIG. 1b on the right, a brief general description of the central processing unit (CPU), which incorporates a memory protection system to which the invention relates, will be given.

GENERAL DESCRIPTION

The CPU consists of an instruction register IR, a register stack of accumulator/working registers ACC STK, a result register RES REG, an operand register OPREG, a micro-programme control unit $\mu$PROG, an arithmetic unit MILL, a data comparator COMP, a store data input register SDIREG and a pair of memory protection register stacks BASE STK and TC/LMT STK. Typically the three register stacks (ACC STK, BASE STK and TC/LMT STK) may be constructed using so-called scratch-pad units and these scratch-pad units are provided with line selection circuits (SELA, SELB and SELL respectively) which control the connecting of the required "register" to the input and output paths of the stack.

The CPU is organized for parallel processing, although for ease of presentation the various data paths have been shown as a single lead in FIGS. 1*a* and 1*b*. The CPU is provided with a so-called main highway MHW, a store input highway SIH and a store output highway SOH. Each of these highways is typically of 24 bits corresponding to the size of a store word. Both store highways additionally incorporate control signal highways SIHCS and SOHCS respectively. The storage unit is not shown in FIGS. 1*a* and 1*b* it is to be assumed that the CPU is connected to, for example, a bank of storage modules by way of the store output highway SOH and the store input highway SIH. Additionally although only one CPU is shown in FIGS. 1*a* and 1*b* the invention may be incorporated in a so-called multiprocessor system and in such case each CPU is provided with its own "bus system" and each storage module will be accessed by way of a "cycle-stealing" unit to resolve concurrent CPU/store module accesses.

Associated with the various highways are a number of micro-program signal controlled AND gates such as G10 (i.e. those gates which include a number 2 inside them). It must be realized that each gate in practice will consist of twenty-four gates one for each lead in the twenty-four bit highway and these gates are activated under micro-program control to allow the data on the various highways to be written into selected registers as required. AND gating, such as gate G6, is also provided on the output of the registers and register stacks allowing selective connection of the various registers to the arithmetic unit MILL. Also shown in FIGS. 1*a* and 1*b* are a number of OR gates (i.e. those gates which include a number 1 inside them) these simply being used for isolation purposes allowing two or more signal paths to be ORed into one input path.

Accumulator stack ACC STK

This scratch-pad unit is used to provide a number of accumulator registers, mask registers and modifier registers and the required one of these registers may be selected either under micro-program or "instruction word control field bits" control. Also included in the accumulator stack ACC STK is the sequence control register (SCR) and additional registers such as a scheduler time clock register and a program time clock register. These latter group of registers are only selectable under micro-program control or by special instruction. The required register is selected by passing a selection code to the scratch-pad unit selection circuit SELA which effectively connects the required register to the input and output paths of the scratch-pad unit.

Base register Stack BASE STK

This scratch-pad unit is used to provide a number of "half" capability registers for the CPU. It was stated above that the memory protection system incorporates a number of so-called capability registers each of which holds a segment descriptor which consists of a base address, a limit address and a permitted access type code. The base register stack holds the base addresses for all the capability registers provided in a processor unit. FIG. 2 on the lefthand side shows the half capability registers held in this stack and they consist of eight so-called "work space capability" registers WCRO to WCR7 and a number of so-called "hidden capability" registers. Only two of the "hidden capability" registers are shown DCR, and MCR as these are the only ones which are of importance to the understanding of the invention. The "workspace capability" registers are selectable by selection codes in the instruction word while the "hidden capability" registers are only selectable by special instruction word control codes and by micro-program generated selection codes.

The "workspace capability" registers are used to hold segment descriptors which define some of the working areas of the store to which the current CPU program requires access. One, or more of the workspace capability registers is used to hold a segment descriptor which is defined as a "reserved segment pointer table" RSPT and the significance of this table will be described later. Also workspace capabiltiy register SCR7 may for example be used to define the current program segment.

The "hidden capability" registers are used to hold segment descriptors which define administration areas. Typically capability register DCR holds the segment descriptor defining a "program dump" area. The other "hidden capability" register which is of significance to the present invention is the master capability table register MCR and the use of this capability register will be seen later.

Each base address of a capability register indicates (a) the store module (eight bits) in which the segment is located and (b) the base or start address of that segment (sixteen bits).

Type code/limit Stack TC/LMT STK

This stack provides the other "half" of the capability registers and it is shown on the right hand side of FIG. 2. Each capability register is formed of a corresponding line in both the Base stack and the Type code/limit stack.

Each type code/limit section of a capability register indicates a) the permitted access type to the segment (eight bits) and (b) the last address (sixteen bits) of the segment in the store module defined by the base address.

FIG. 3 shows a typical set of permitted access type codes. The eight bit type code is divided into three sections as follows (i) permitted store operation PS (ii) Data type DT and (iii) Routing RTE.

The permitted store operation section (PS) defines typically store read only (STR), store write only (STW) or store read and write (STR/W).

The data type section (DT) defines typically that the segment is data (D), that the segment is program (P) (i.e. instruction words) or that the segment is a program reserved segment pointer table (PRSP).

The last section of the type code, the routing section (RTE), defines the administration type of the segment indicating typically that the segment is (a) a normal store operating segment NSO (e.g. a file), (b) a Queue segment Q which stores data packets on a "last-in last-out" basis, (c) a program dump area DUMP which in the case of sub-routine nesting may be operated on a queue basis or (d) an internal registers segment IR.

Certain combinations of permitted store type (PS), data type (DT) and routing (RTE) are used to define the various segment types and obviously certain combinations are invalid. The type code is used in the micro-program unit μPROG to check the type of operation required on each store access and to prevent unauthorised accesses occurring. The significance of certain of these type codes will be seen later when the operation of a "load capability register" instruction is described.

Result Register RES REG

This register is fed from the CPU main highway MHW by way of gates G15 and may be used to temporarily store the result of an arithmetic operation.

Operand Register OPREG

This register may be fed from either the main CPU highway MHW by way of gates G2 or the store output highway SOH by way of gates G12 and it may be used as an intermediate register in the formation of a store access address. The instruction word is fed into this register when an instruction word is read from store.

Instruction Register IR

This register is used to hold the control bit fields of an instruction word. Each instruction word consists of a number of control fields and an offset address. FIG. 4 shows a typical instruction word. The twenty four bits of an instruction word are divided into eight offset address bits (OS) and sixteen control bits (CF). The control bits CF are divided into five control field sections.

Bits 9–11 form a workspace capability register selection field WCRA which defines the capability register holding the segment descriptor to which the instruction word offset value relates. This field is active in both the Base stack, (BASE STK) and the type/limit stack (TC/LMT STK) of the CPU of FIGS. 1*a* and 1*b*. The actual store address used in a store access instruction is a store location whose address is defined by the offset value removed from the base address in the capability register specified by the WCRA selection field bits.

Bits 18 to 20 form a second register selection field (SR) and they may be used to define one of the accumulator stack ACC STK registers of FIG. 1*a* or a second workspace capability register, in the BAST STK and TC/LMT STK of FIGS. 1*a* and 1*b*. The significance of the latter use of these bits will be seen later.

Bits 21–23 form a modifier selection field (M) and they are used to define one of the accumulator stack ACC STK registers whose contents is to be used as an address modifier. M=O is used to signify no modification required.

Bit 24 is used as a discriminator bit for use for example in qualifying the offset address as an address or as a literal value. This bit has no real relevance to the operation of the CPU in the functioning of the invention as it will be in the 'O' state when the offset refers to store addressing and will, therefore, not be considered again.

Bits 12–17 form the instruction word function code (FC) and these are used to address the micro-program unit μPROG (FIG. 1b) to control the CPU in the execution of the required instruction.

Micro-program Unit μPROG

This unit controls the sequencing, register selections and arithmetic unit functions required in the performance of an instruction and it issues timed and sequenced control signals to the various input and output gates of the registers and the arithmetic unit (leads AUμS) to control the transfer of data. The segment descriptor type codes are also used to address the micro-program unit μPROG, over leads CRTC, to allow the micro-program unit to check the store access operations. The micro-program unit is also able to select registers from the accumulator stack and the capability register stacks and the significance of the operations will be seen later. Finally certain condition signals are taken from the arithmetic unit MILL (leads AUIS) and the comparator COMP (leads CIS) for use in the micro-program unit in the execution of the micro-programs of each instruction cycle. The micro-program control signals are shown grouped together in FIG. 1*b* by leads μPGCS. Typically the micor-program unit may include a read only memory which stores the control signals required for each instruction micro-program operation.

Arithmetic Unit MILL

This unit is a conventional arithmetic unit capable of performing parallel arithmetic and logical operations on the data words presented over its two input ports. Its result is connected over the main highway MHW to a micro-program defined destination. The actual operations performed by the MILL are defined by the arithmetic unit micro-program control signals AUμS produced by the micro-program control unit μPROG.

Comparator COMP

This unit is used to compare the address loaded in the store data input register SDIREG with the base and limit addresses of the segment descriptor relative to the store access and to compare the type code with the store control signals. The condition indicating output signals CIS produced by the comparator COMP are fed to the micro-program unit μPROG as part of the arithmetic unit condition signals AUCS. The significance of the comparator's function will be evident later.

Store Data Input Register SDI REG

This register acts as the "CPU-to-store" output register and the data for passage to the store unit is assembled in this register prior to its passage to the store over the store input highway SIH.

The invention together with its various features will now be described in connection with the functions performed by one embodiment in the execution of a "load workspace capability register" instruction.

LOAD Work-space Capability Register

The procedures required to perform this instruction operation will be described with particular reference to FIGS. 5 and 6 while the actual manipulations performed by the CPU will be described with reference to FIGS. 1*a* and 1*b*.

General Description of Load WCR

Referring firstly to FIG. 5 a broad out-line of the essential operations of the "load workspace capability register" (LD WCR) instruction will be given. The format of the instruction word IW for the (LD WCR) instruction is shown at the top of FIG. 5. The instruction word IW contains the following information:

bits 1–8 Specifies the offset (X) which relates to the "reserved segment pointer table" RSPT, bits 9–11 Specifies the capability register (WCRA) which holds the segment descriptor for the "reserved segment pointer table", bits 12–17 Specifies the "load workspace capability register" function code, bits 18–20 Specifies the workspace capability register (WCRB) to be loaded, bits 21–23 Specifies the modifier register whose contents are to be used to modify the offset X if required while bit 24 Specifies store or direct mode addressing and will be assumed to be "O" indicating that "X" is to be considered as the offset from the base held in the specified capability register.

The sequence of the LD WCR instruction is started by modifying the "X" offset value and then forming the reserved segment pointer table address by the addition of the base value from the workspace capability register WCRB (which may for example by capability register WCR6). The "reserved segment pointer table" RSPT contains a list of single word entries defining the segment descriptors reserved for the current program. Each entry is composed of two parts (i) the type code TC and (ii) a value Y which is termed the reserved segment pointer. The type code TC is placed in the workspace capability register to be loaded (e.g. WCR2) and the value Y is used as an offset down the master capability table. The segment descriptor for the master capability table is held in the "hidden capability register" MCR and this capability register is selected under micro-program control. The offset Y is, therefore, added to the base address of the master capability table and the required entry is accessed. Each entry in the master capability table MCT consists of three words (i) the address BASE of the segment descriptor, (ii) the last address LIMIT of the segment descriptor and (iii) the check code CHECK for the segment descriptor. These three words are read sequentially from the MCT entry and the base address BASE and the last address LIMIT are fed into the workspace capability register WCR2 to be loaded.

Detailed Description of "Load WCR"

Figure 6:
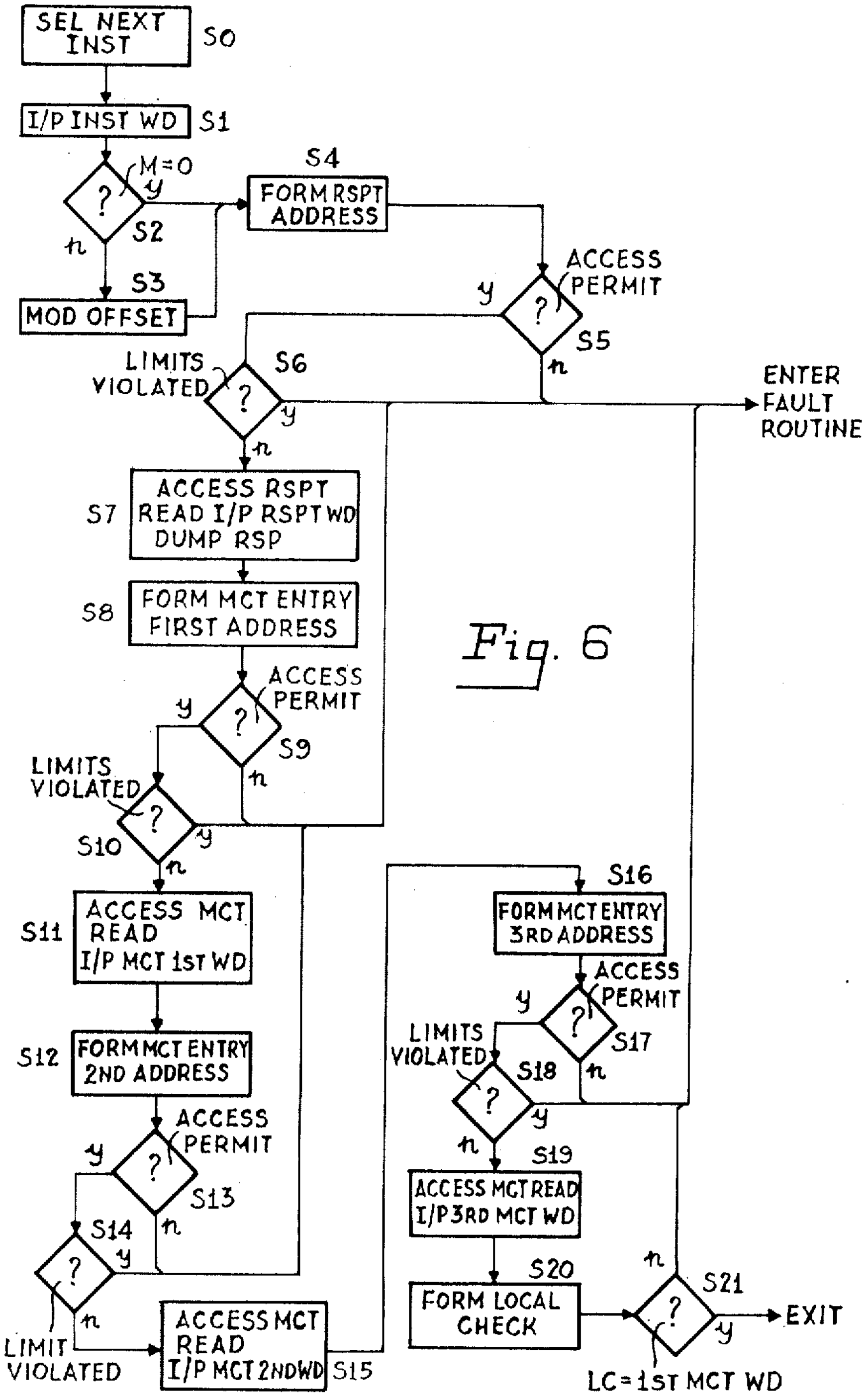

Referring now to FIG. 6, showing a flow diagram of the instruction sequence performed under the control of the micro-program unit and the actual sequence of operations performed by the central processor unit of FIGS. 1*a* and 1*b* will now be given for the "load workspace capability register" instruction. All the steps shown in FIG. 6 are performed by the various equipment of a processor unit under the control of control signals produced by the micro-program unit μPROG by the activating at required times of the AND gates and by the presentation of micro-program control signals to the various equipments.

Step SO-SEL NEXT INST

This step in actual fact would be performed as a housekeeping operation at the end of the instruction immediately preceding the LD WCR instruction, however, it has been included in FIG. 6 to show more fully the operation of the CPU and the memory protection system.

Figure 1A:
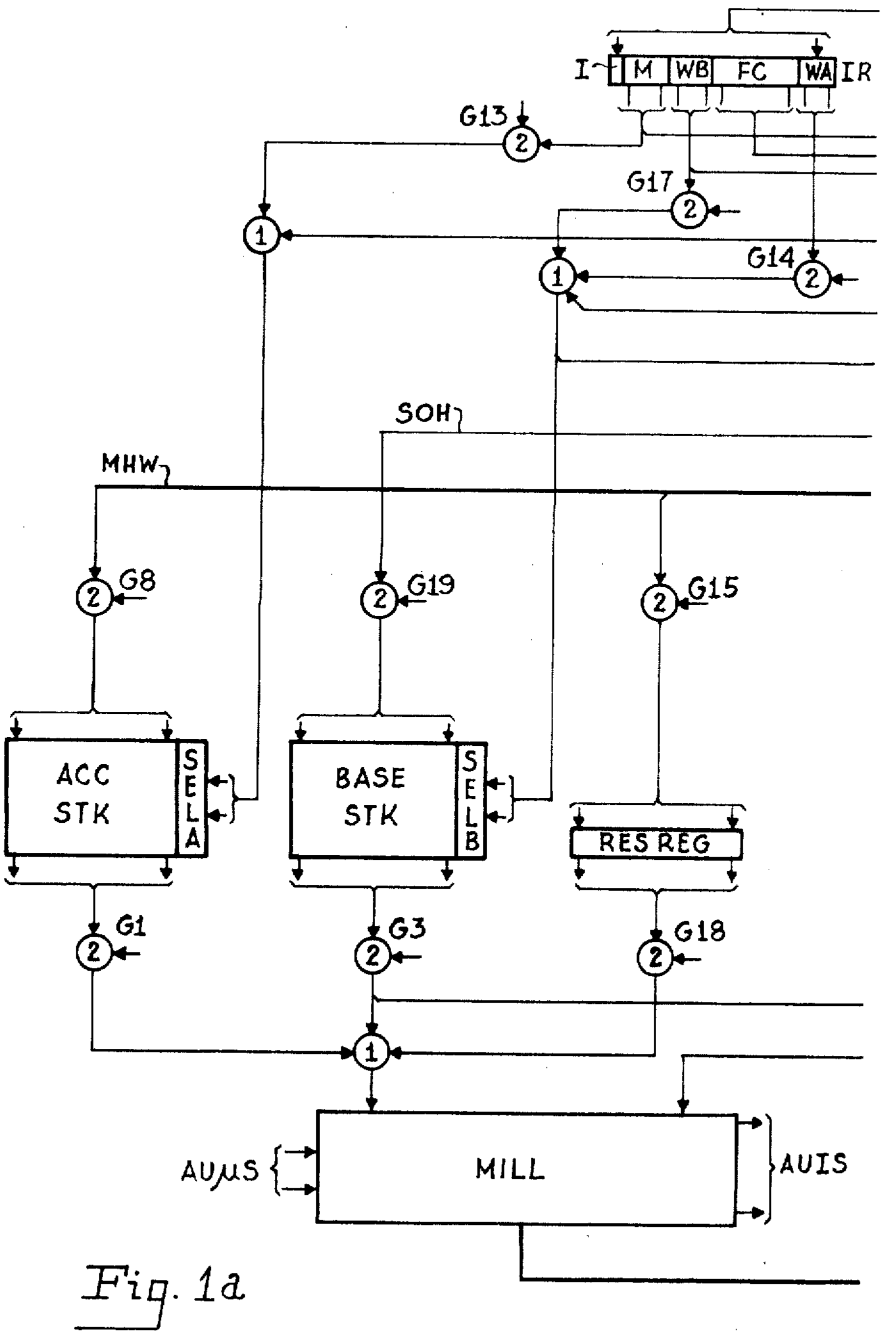
Figure 1B:
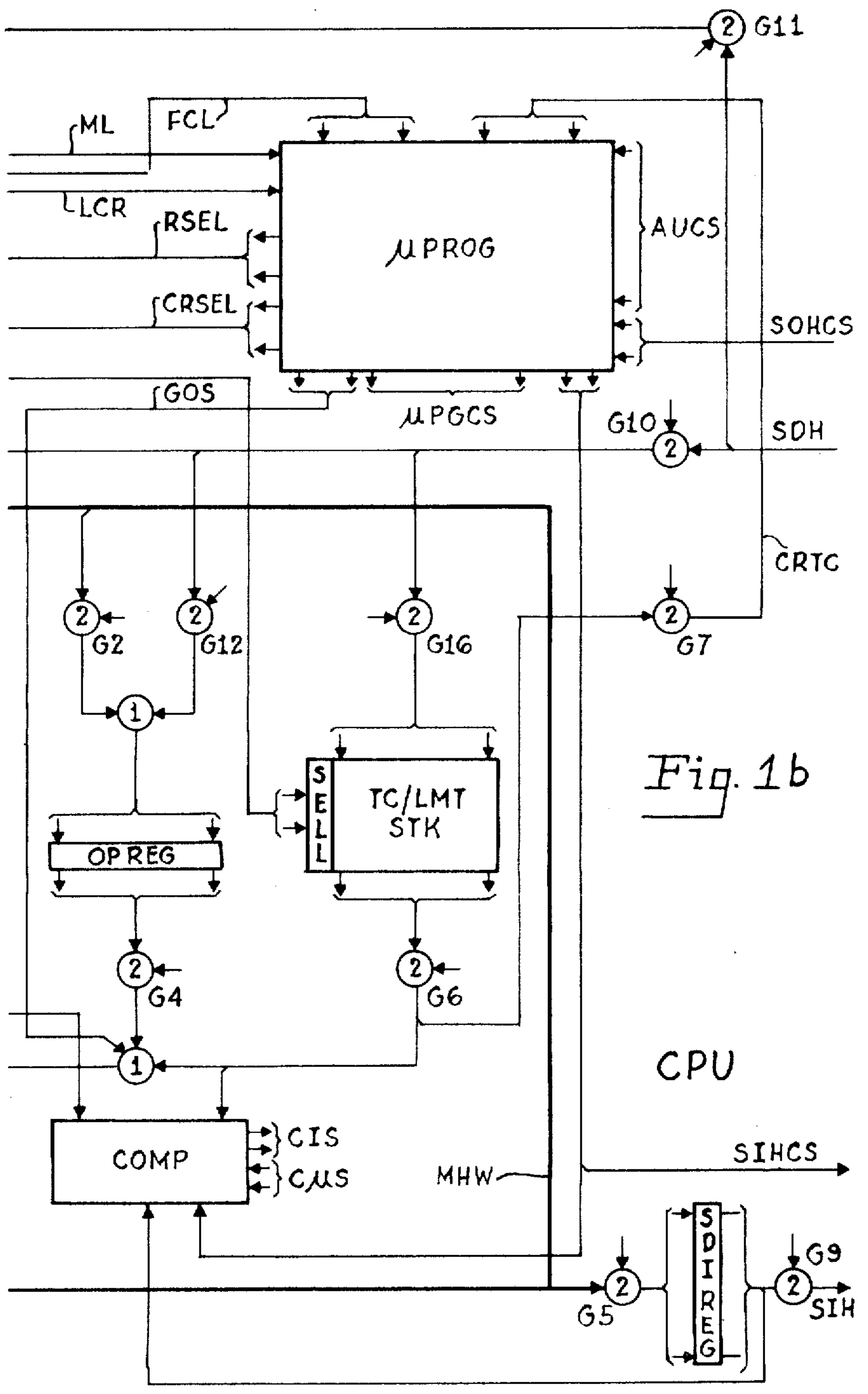
Figure 2:
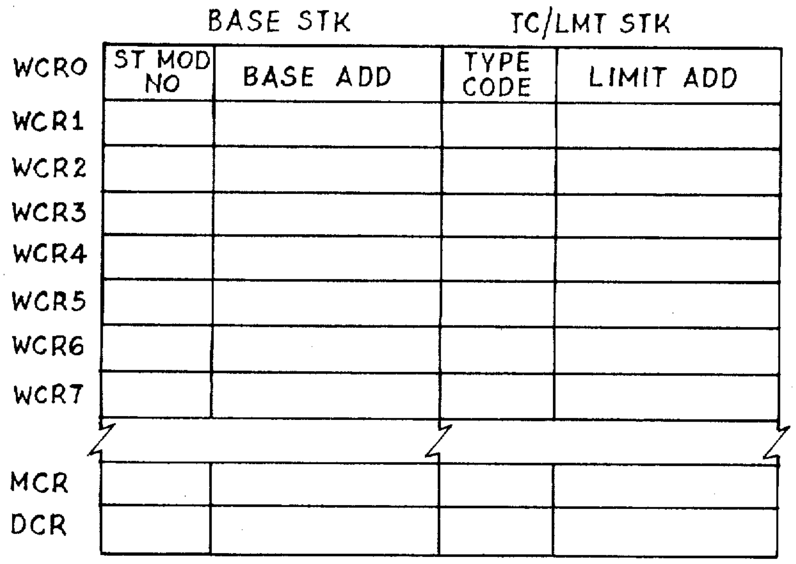

The micro-program μPROG of FIG. 1*b* when controlling the performance of this step issues control signals to firstly select the sequence control register in the accumulator stack ACC STK, over leads RSEL and open gates G1 thereby causing the SCR value, which it is currently defining the instruction word of the instruction which has just been performed in the current program, to be presented to the arithmetic unit MILL. The arithmetic unit MILL will be instructed to "add 1" to the SCR value and by opening gates G2 the incremented SCR value will be passed over the main CPU highway MHW to the operand register OP REG. The micro-program unit μPROG now selects, over leads CRSEL, the base half of the program capability register WCR7 (FIG. 2) which is holding the base address of the segment descriptor for the current program segment. At this time gates G3 are also opened together with gates G4 causing the program segment base address and the incremented SCR value to be passed to the arithmetic unit MILL input ports. The MILL is instructed to add the two data words and the result (i.e. Program segment base address plus the incremented SCR value) is placed, by opening gates G5, into the store data input register SDIREG ready for passage to the store unit.

At the time of selecting the base half of capability register WCR7 the other half in the limit stack TC/LMT STK is also selected. After the next instruction address has been placed in the store data input register SDIREG gates G3 and G6 are opened allowing the comparator COMP to compare the next instruction address with the limits of the program segment and to compare the required store access, as specified by the store input highway control leads SIHCS, with the access type code for the program segment. At this time also gates G7 are opened causing the type code of the program segment to be passed to the micro-program unit μPROG over leads CRTC for use as additional address information for the further sequencing of the operations.

Assuming that the next instruction address is valid (i.e. within the program segment limits) the micro-program unit μPROG opens gates G9 causing the store unit to perform a read operation. The read operation is defined by the control signals on leads SIHCS and one of these leads is used as a timing wire which when activated indicates to the store unit that address data is being presented on the store input highway. The store, therefore, reads the next instruction word address. Concurrent with this operation the micro-program unit μPROG will open gates G4 and gates G8, after selecting over leads RSEL the sequence control register SCR in the ACC STK, allowing the incremented SCR value to be fed via the MILL and the main highway MHW into the SCR.

The flow diagram of FIG. 6 is now held until the store unit produces the next instruction word on the store output highway SOH. The presence of this word on SOH is indicated by control signals on the accompanying control signal highway SOHCS.

Step S1-I/P INST WD

When the store unit has read the next instruction word and presented it to the bus to which the CPU is connected the micro-program unit μPROG FIG. 1b will cause gates G10 and G11 to be opened together with gates G12. The next instruction word is read into the instruction register IR (bits 9–24 only) and the operand register (bits 1–24). It will thus be seen that the control field (bits 9–24) are placed in the instruction register IR while the entire instruction word is placed in the operand register OPREG. The Function code FC, which in this case of course specifies a "load workspace capability register" LD WCR operation, is used to address the μPROG over leads FCL to control the instruction sequence.

Step S2 — M=O?

In this step the state of the modifier field bits are interrogated, over leads ML, by the micro-program unit μPROG to see if modification of the offset X of the instruction word is required. If modification is required step S3 is performed.

STEP S3 - MOD OFFSET

In this step gates G13, G1 and G4 are opened to (i) select the required modifier register in the ACC STK as defined by the modifier control field bits M, (ii) to feed the modifier value so defined to one port of the MILL and (iii) to feed the offset X to the other port of the MILL. The MILL is then instructed to perform an ADD operation and by opening gates G2 the modified offset (X + M) is passed from the MILL over the main highway MHW to the operand register OPREG overwriting the previous contents of that register.

Upon completion of step S3, or if M=O in step S2, the micro-program enters step S4 of FIG. 6.

STEP S4 - FORM RSPT ADDRESS; SAVE RSPA

Figure 5:
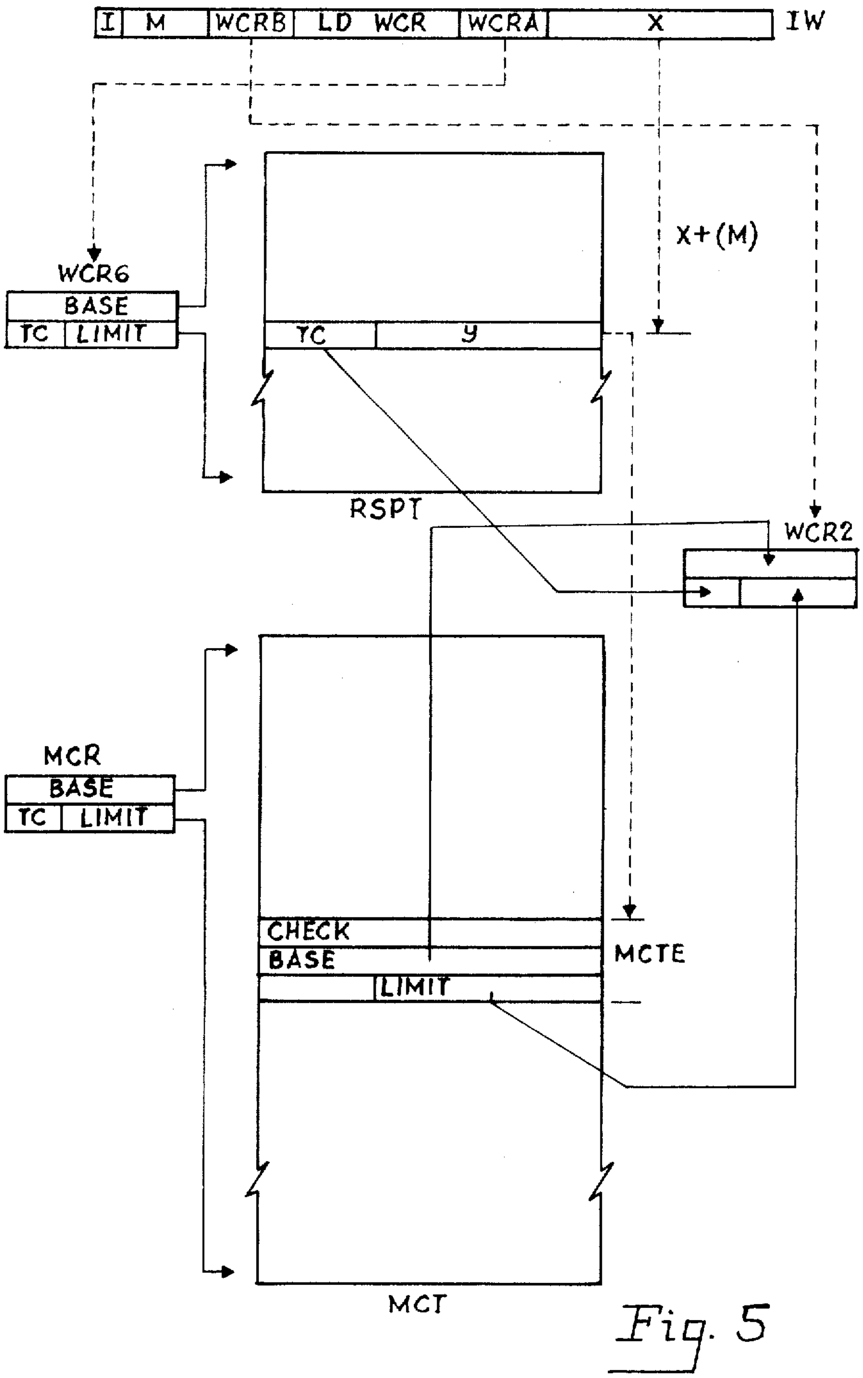

In this step the offset (or the value obtained in step S3) currently held in the operand register OPREG FIG. 1*b* is used to form the entry address for the "reserved segment pointer table" RSPT by the opening of gates G14, G3 and G4 (bits 1–8 if step S3 has not been performed or bits 1–24 if it has). The opening of gates G14 causes the base half capability register defined by the control field bits WA to be selected. Reference to FIG. 5 shows that this workspace capability register is assumed to be WCR6 and the selection code is shown as WCRA. Hence the opening of gates G3 and G4 in FIGS. 1a and 1b causes the base address of the RSP table to be passed to one port of the MILL and the offest X + (M) in the operand register OPREG to be passed to the other port of the MILL. The MILL is then instructed to perform an ADD operation and gates G5 are then opened to place the formed RSP Table entry address into the store data input register SDIREG.

STEP S5 - ACCESS PERMIT ?

Figure 3:
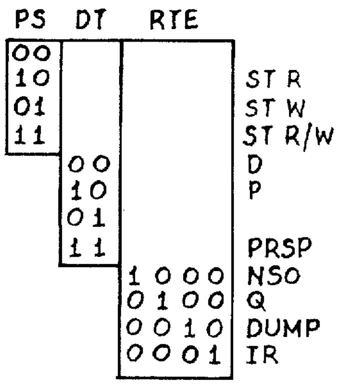
Figure 4:
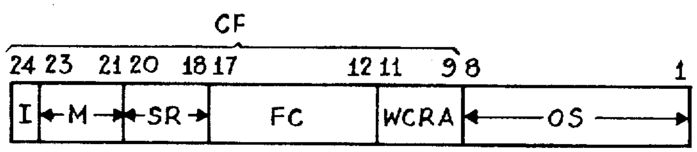

In this step gates G14, G6 and G7 of FIGS. 1a and 1b are opened allowing the type code for the RSP table segment descriptor to be passed over leads CRTC so that the required access to the store unit, to be performed in step S7, may be checked against the permitted access type code for the segment by the comparator COMP. The actual type code will of course be that of a reserved segment pointer table and reference to FIG. 3 will show that (i) the store may only be read (i.e. PS=10) (ii) that the data type is an RSP table (i.e. DT=01) and (iii) that the routing is a normal store operation (i.e. RTE =1000). Having checked the required mode of accesses step S6 of FIG. 6 is performed if the required access is allowed.

Step S6 - LIMITS VIOLATED ?

In this step the micro-program unit μPROG FIG. 1b will open gates G14, G3 and G6 and it will instruct the comparator to check the reserved segment pointer table entry address in the store data input register SDIREG against the base and limit addresses of the RSP table segment descriptor in capability register WCR6. If the limits have not been violated step S7 of FIG. 6 is performed.

STEP S7 - ACCESS RSPT; READ; I/P RSPT WD; DUMP RSP

This step consists of three distinct parts (i) access the store to read the required entry in the reserved segment pointer table (ii) input the read RS pointer and (iii) dump the RS pointer.

i. Access store. This part of step S7 is performed by the application of the timing signal to the control signal highway SIHCS and by the opening of gates G9 in FIG. 1b allowing the reserved segment pointer table entry address, formed in step S4, to be passed over the store input highway SIH accompanied by the "read" control signal on the control signal highway SIHCS.

ii. Input R.S. pointer word. This part of step S7 will be activated when the pointer word read in part (i) is passed over the store output highway SOH to the CPU. The micro-program unit μPROG will cause gates G10, G12, G16 and G17 to be opened. The pointer word, which is in two sections consisting of a type code (TC) and an offset (Y), as shown in FIG. 5, is loaded completely into the operand register OPREG and the type code is loaded into the chosen workspace capability register (i.e. the WCR specified by WB in the instruction word which is assumed in FIG. 5 to be WCR2) in the TC/LMT STK.

iii. Dump R.S. pointer In this part of step S7 the pointer found in part (ii), which was written into the operand register OPREG, is written into a particular location in the current programme's dump area. The actual location used in the dump area is one which is "dedicated " to the workspace capability register being loaded (i.e. WCR2). The actual address of this location is defined by extracting from the base stack BASE STK the base address of the dump segment descriptor (i.e. hidden capability register DCR in FIG. 2) under micro-program control and adding to it an offset which is micro-program generated in accordance with the workspace capability register to be loaded. The micro-program generated offset is passed over leads GOS to one port of the MILL while the base address of the dump area segment is extracted from DCR by the required code on leads CRSEL and the opening of gates G3. The MILL output will then be passed to the store data input register SDI REG (by opening gates G5) and after the access and limit checks have been performed (in the similar manner to that of steps S5 and S6) the store will be accessed for a write operation.

The store unit will ultimately indicate, over the control signal highway SOHCS that it is ready for the write operation and the micro-program control unit μPROG will respond by opening gates G4, G5 and G9 allowing the reserved segment pointer table entry, recorded in step S7, to be passed via the MILL and main highway MHW to the store data input register SDIREG and thence to the store over the store input highway. Having completed this operation the micro-program of FIG. 6 steps on to step S8.

STEP S8 - FORM MCT ENTRY 1ST ADDRESS

In this step the offset Y, received in the previous step and now held in the operand register OPREG is used to form the address of the first word of the required entry in the master capability table MCT. The micro-program unit μPROG FIG. 1b causes leads CRSEL to carry a control field which causes SELB and SELL to select the master capability register MCR which holds the segment descriptor for the system master capability table. At the same time gates G3 and G4 are opened and the MILL is instructed to ADD the data words at its input ports. The MILL therefore produces a data word (MCT base + Y) which is then fed, by opening gates G5, into the store data input register SDI REG. At the same time gates G15 are opened to "save" the MCT first address in the result register RES REG.

STEP S9 - ACCESS PERMIT ?

The type code of the segment descriptor for the master capability table is checked against the store operation required in this step and step S10 is entered if access is allowed. Gates G6 will be activated and leads CRSEL will be conditioned to select the master capability register MCR in this step to define the type code.

STEP 10 - LIMITS VIOLATED ?

This step is similar to step S6 above, however, the base and limit values in this case are those of the master capability table segment descriptor from hidden capability register MCR.

Step S11 is then entered assuming no fault condition has been detected in steps S9 and S10.

STEP S11 - ACCESS MCT; READ: I/P MCT 1ST WD

This step is performed in two parts; (i) access the store for a read operation at the first address of the required master capability table entry and (ii) read the first (i.e. segment descriptor sum check code CHECK of FIG. 5) word of the master capability table entry into the CPU.

i. Read first MCT entry word. This part of step S11 is performed by the micro-program control unit μPROG FIG. 1b opening gates G9 and placing the "read" code on the control signal highway SIHCS. The store upon receiving the MCT entry first word address reads the sum check code and passes it to the CPU over leads SOH with the accompanying code on the store output control signal highway SOHCS.

ii. Input first MCT word The micro-program unit μPROG responds to the reception of the first word of the MCT entry by opening gates G10 and G12 causing the sum check code CHECK to be fed into the operand register OPREG overwriting the contents.

STEP S12 - FORM MCT ENTRY 2ND ADDRESS

In this step the MCT entry first word address, which was written into the result register RES REG in step S8, is incremented by one to form the MCT entry second word address. This operation is performed by opening gates G18 (FIG. 1*a*) and activating the MILL to perform a "+1" operation under micro-program control. Gates G5 are opened when the MILL has completed the operation to read the incremented address into the store data input register SDIREG. Concurrent with the opening of gates G5, gates G15 are also opened allowing the incremented MCT entry address to be fed into the result register RES REG.

STEP S13 – ACCESS PERMIT ?

This step is the same as step S9.

STEP S14 – LIMIT VIOLATED ?

This step is similar to step S10 checking the MCT entry second word address for within limits.

STEP S15 – ACCESS MCT; READ; I/P MCT 2ND ADD

This step, which is very similar to step S11, is performed in two parts (i) address store for read of MCT entry second word and (ii) input read second word to CPU.

i. Read second MCT entry word. This part of step S15 is performed by the micro-program control unit μPROG FIG. 1*b* opening gates G9 and placing the "read" code on the control signal highway SIHCS. The store upon receiving the MCT entry second address reads the base address BASE (FIG. 5) of the selected segment descriptor, which is to be loaded into workspace capability register WCR2, and passes it to the CPU over the store output highway SOH with the accompanying code on the control signal highway SOHCS.

ii. Input second MCT entry word. The micro-program control unit μPROG FIG. 1*b* responds to the reception of the second word of the MCT entry by opening gates G10 and G19 after opening gates G17 thereby allowing the base address of the selected segment descriptor to be fed into the base half capability register selected by the WB control field of the instruction word (i.e. capability register WCR2).

STEP S16 - FORM MCT ENTRY 3RD ADDRESS

The micro-program control unit μPROG opens gates G17 and activates the MILL to perform a "+1" operation before activating gates G5 in this step. This causes the MCT entry second word address, which was placed in the result register RES REG in step S12, to be incremented by one to form the MCT entry third word address. The opening of gates G5 allows the so generated third word address to be written into the store data input register SDIREG.

STEP S17 — ACCESS PERMIT ?

This step is the same as steps S13 and S9.

STEP S18 — LIMITS VIOLATED ?

This step is similar to steps S14 and S10 checking the step S16 generated third word address for limit violation.

Step S19 is entered, in FIG. 6, if no fault condition is detected in steps S17 and S18.

STEP S19 - ACCESS MCT; READ; I/P 3RD MCT WD.

This step, which is again very similar to steps S15 and S11, is performed in two parts (i) read MCT entry third word and (ii) input read third word to CPU.

i. Read third word. This part of step S19 is performed by opening gates G9 and sending the "read" code on control signal highway SIHCS. The store, therefore, reads out the limit address LIMIT of the selected segment descriptor.

ii. I/P read third word. This part of step S19 causes the MCT entry third word to be passed into the type/limit stack TC/LIM STK to place the limit address into the requisite area of the second half workspace capability register WCR2. Gates G17, G10 and G16 will be opened under micro-program control At this stage in the sequence the workspace capability register WCR2 has been filled by the required segment descriptor as defined by the instruction word offset. Step S7 inserted the access type code TC, Step S15 inserted the base address BASE while step S19 inserted the last address LIMIT. All that remains now is to check that the workspace capability register WCR2 has been correctly loaded with the segment descriptor "bounds" (i.e. BASE and LIMIT). This operation is performed in steps S20 and S21 of FIG. 6 and involves the use of the sum check code CHECK which was read from the first word of the selected MCT entry into the operand register OPREG in step S11.

STEP S20 - FORM LOCAL CHECK

In this step the micro-program control unit μPROG FIG. 1*b* causes the base address and the limit address of the loaded workspace capability register (i.e. WCR2) to be passed to the MILL over separate ports and added to form a local sum check. Gates G17, G3 and G6 are opened in this step and the MILL is conditioned to perform an ADD operation. Gates G15 are then opened to read the result from the MILL, over highway MHW, into the result register RES REG.

The above operation has computed a local sum check word in the result register and it now only remains to compare this with the data in the operand register. This is performed in step S21 of FIG. 6.

STEP S21 — LC = 1ST MCT WD

Gates G4 and G18 are opened in this step allowing the arithmetic unit MILL to compare the two data words. Typically the MILL may be arranged to subtract one word from the other and to detect if the result is zero. If the result is zero the instruction cycle is exited to a select next instruction housekeeping phase whereas if the result is not zero the micro-program fault routine will be entered.

Reference to the 1961 edition of "Understanding Digital Computers" by Paul Siegely published by John Wiley & Sons, Inc: New York at chapters 8 and 10 for gates (such as G1) and registers such as IR, chapter 14 for the arithmetic unit (MILL) and chapter 15 for the control unit (μPROG) shows typical examples of equipment suitable for use in the various block elements shown in the drawings, with the exception of the scratch-pad memory stacks and the micro-program control unit in its read-only memory form. Reference to Chapter 16 of the 1971 edition of "Semi-Conductor Memories", edited by Jerry Einbinder and published by John Wiley & Sons, Inc: New York, provides information on typical location (or line) addressable random-access memories ideally suited to the fabrication of scratch-pad memory stacks. Chapter 14 of the same publication provides information on the fabrication of a micro-program control unit using read-only memory elements.

From the above description it can be seen that each segment descriptor is held in a master capability table and a reserved segment pointer table is used to gain access to a required segment descriptor. When loading a workspace capability register the pointer used is stored in a dump area segment at a particular location, hence, if the program is suspended after loading the workspace capability register and the segment to which it relates is relocated while the program is suspended the segment descriptor for that capability register can still be recovered when the program is re-run as the new locations of the relocated segment will be placed in the master capability table at the time of relocating that segment.

Also the arrangement of including the segment descriptor type code in the reserved segment pointer table entry allows two or more programs to be given the capability of accessing the same segment but with differing modes of access. It will be appreciated that not all the access type code information requires to be included in the reserved segment pointer table as some of this information, for example the data type (DT) or the routing (RTE) information would be common to all references thereto and this for example may be held in the master capability table. It is then necessary to "merge" the RSP table access type code and the MC table type code when loading the type code section of the capability register.

Finally the use of the addition of a sum-check code in the master capability table entries has the important advantage of allowing a CPU to verify the accuracy of the loading of the capability registers and thereby the accuracy of the stored data in the master capability table and also some of its own hardware functions. It will be realized that each master capability table entry has three separate entries and this has an additional advantage as it inherently protects against single bit errors in the store location addressing mechanism. The specification has referred to the use of a "sum check" code, however, it will be readily appreciated that other checking codes, such as an "exclusive or" of the two words, could be used.

Other alternative arrangements of the single embodiment described above will be readily conceived by those skilled in the art and the description of this embodiment is not intended to limit the invention thereto. For example the use of scratch pad units for the various registers is typical only each register could readily be fabricated as an individual unit. Also it has been assumed that the storage unit is remote from the CPU and it is suggested that it may be fabricated in modular form and accessed by a number of CPU's each having their own bus system. However it will be realized that the invention is equally applicable to a system in which a single CPU is provided having its own dedicated storage unit.

What we claim is:

1. In a time-sharing data processing system including a central memory adapted to store information in segments and at least one processing unit including a plurality of capability register means each arranged to store segment descriptor information indicative of the base and limit memory addresses of an information segment together with access-type information indicative of the permitted mode of access which may be used to the segment defined by the base and limit addresses, each said processing unit including means for performing a load capability register instruction whose instruction word contains information defining (a) the identity of a capability register means to be loaded, (b) the identity of a first one of said capability register means and (c) an offset value, the improvement comprises in combination (i) a first one of said capability register means for holding a first segment descriptor relative to an information segment which contains a reserved segment pointer table particular to a program currently being executed by said processing unit, (ii) a second one of said capability register means so holding a second segment descriptor relative to an information segment which contains a master capability table, said master capability table having an entry for each information segment in said central memory, each entry including information defining the base and limit addresses of a segment, said reserved segment pointer table including a list of data words which are used as pointers to define different entries in said master capability table, each of said data words in said reserved segment pointer table being accompanied by permitted access-type information, and (iii) capability register loading means comprising;

first means for forming an address of a pointer word in said reserved segment pointer table by adding said offset value to the base address held in said first one of said capability register means;

second means for reading a data word from the formed address in said reserved pointer table;

third means for inserting the permitted access type information read from said pointer word into said capability register means to be loaded;

fourth means for forming an entry address in said master capability table by adding the pointer word read from said reserved pointer table to the base address held in the said second one of said capability register means; and fifth means for reading the base and limit information from the entry addressed by said fourth means in said master capability table into the capability register means to be loaded.

2. A time-sharing data processing system as claims in claim 1 and wherein said processing unit includes means for writing into a dump area segment particular to the program, at a location therein particular to the capability register means to be loaded, the pointer word read from the selected address in said reserved segment pointer table.

3. A time-sharing data processing system as claimed in claim 2 and wherein each entry in said master capability table consists of three words, a first of which defines a segment descriptor check-code having a form which is significant of the base and limit memory addresses in combination of the same entry, a second of which defines the base address of the segment descriptor and a third of which defines the limit address of the segment descriptor, said processing unit further including means for reading said check-code;

means for forming a local check-code involving the base and limit addresses loaded into said capability register means to be loaded and means for comparing said check-code with said local check-code.

* * * * *